United States Patent [19]
Inniss et al.

[11] Patent Number: 5,539,808
[45] Date of Patent: Jul. 23, 1996

[54] METHOD AND SYSTEM FOR ENHANCED PROCESSING OF AUDIO MESSAGES WITH A DATA PROCESSING SYSTEM

[75] Inventors: Haydn A. Inniss, Farmington Hills, Mich.; Marvin L. Williams, Lewisville, Tex.

[73] Assignee: International Business Machines Corporation, Armonk, N.Y.

[21] Appl. No.: 913,255

[22] Filed: Jul. 14, 1992

[51] Int. Cl.[6] .................................................. H04M 1/64
[52] U.S. Cl. ........................... 379/67; 379/201; 379/101
[58] Field of Search ............................. 379/67, 88, 89, 379/201, 93, 96, 101, 102; 395/2, 2.1; 370/61, 62, 105

[56] References Cited

U.S. PATENT DOCUMENTS

| | | | |
|---|---|---|---|
| 4,602,129 | 7/1986 | Matthews et al. | 379/67 |
| 5,097,528 | 3/1992 | Gureahancy et al. | 379/92 |

*Primary Examiner*—Jeffery Hofsass
*Assistant Examiner*—Fan Tsang
*Attorney, Agent, or Firm*—Edward H. Duffield; Andrew J. Dillon

[57] ABSTRACT

The method and system of the present invention are provided for enhancing the processing of audio messages. A user first creates a plurality of selectable audio messages including standard format salutations, originator identification material or other such messages. The selectable audio messages are then stored within the data processing system. Thereafter, the user may explicitly or automatically designate any of the selectable audio messages to be associated with a primary message. The audio messages are then distributed, utilizing the data processing system, to designated recipients. The recipient may then utilize the associated audio message to derive additional information regarding the originator of the primary message and may also obtain access to a repository of selectable audio messages associated with the originator and request a distribution of any or all of these selectable audio messages.

4 Claims, 6 Drawing Sheets

| SELECTABLE AUDIO MESSAGES | | | |
|---|---|---|---|
| SELECTION | MESSAGE | LOCATION | DESCRIPTION |
| 1 | "This is John Originator" | Beginning | - NAME |
| 2 | "At extension 12345" | Beginning | - PHONE NUMBER |
| 3 | "in Product Development" | Beginning | - DEPARTMENT |
| 4 | "If you have any questions or comments please contact me at extension 12345 or at mail station ABC. Thank You." | End | - CLOSURE |
| 5 | "This document was created on mm/dd/yyyy" | Beginning | - DATE |
| ⋮ | ⋮ | ⋮ | ⋮ |
| n | "and the following message is confidential and should be handled using Company confidential procedure 1A-2B3." | Beginning | - DOCUMENT 1 CLASSIFICATION<br>- DOCUMENT 2 CLASSIFICATION |

Fig. 6

SELECTABLE AUDIO MESSAGES (160)

| SELECTION (162) | MESSAGE (164) | LOCATION (166) | DESCRIPTION (168) |
|---|---|---|---|
| 1 | "This is John Originator" | Beginning | - NAME |
| 2 | "At extension 12345" | Beginning | - PHONE NUMBER |
| 3 | "in Product Development." | Beginning | - DEPARTMENT |
| 4 | "If you have any questions or comments please contact me at extension 12345 or at mail station ABC. Thank You." | End | - CLOSURE |
| 5 | "This document was created on mm/dd/yyyy" | Beginning | - DATE |
| ... | ... | ... | ... |
| n | "and the following message is confidential and should be handled using Company confidential procedure 1A-2B3." | Beginning | - DOCUMENT 1 CLASSIFICATION<br>- DOCUMENT 2 CLASSIFICATION |

Fig. 7

| DIGITAL REPRESENTATION (174) | SELECTABLE AUDIO MESSAGE NUMBER 1 (176) | SELECTABLE AUDIO MESSAGE NUMBER 2 (178) | SELECTABLE AUDIO MESSAGE NUMBER n (180) | PRIMARY MESSAGE (182) | SELECTABLE AUDIO MESSAGE NUMBER 4 (184) |

(172)

5,539,808

METHOD AND SYSTEM FOR ENHANCED PROCESSING OF AUDIO MESSAGES WITH A DATA PROCESSING SYSTEM

BACKGROUND OF THE INVENTION

1. Technical Field

The present invention relates in general to the field of data processing systems and in particular to improvements in the efficient distribution of audio messages within a data processing system. Still more particularly, the present invention relates to a method and system which permits a user to distribute selectively designated pre-recorded messages in association with a primary message within a data processing system.

2. Description of the Related Art

With the advent of multimedia devices within data processing systems there has been an increased utilization of audio messages within such systems for communication. No longer must a recipient be present to receive such a message because, as is well known in the art, audio messages may be stored and selectively retrieved at a later time at the convenience of the recipient. For example, an originator's telephone message system and a recipient's telephone message system may be part of a common network which permits so-called "voice mail" to be exchanged. An originator utilization such a telephone system may transmit a telephone message in the form of a telephone call to a recipient which may thereafter be stored within the network and retrieved at a later date by the recipient.

In such systems an originator often sends multiple messages during a given time period which may contain common audio segments. For example, an originator's message may generally begin with a salutation such as "Hello, this is John Originator at extension 12345 in Product Development," and the message may contain additional repetitive phrases such as "the following message should be handled utilizing company confidential procedure 1A-2B3." Additionally, the ending of each such message may include the phrase "If you have any questions or comments please contact me at extension 12345 or at mail station ABC." Thus, upon reference to the foregoing those skilled in the art will appreciate that voice mail messages often include repetitive segments and that verbalizing each of these segments within each audio message is a high inefficient method of conveying this information.

Additionally, the originator may neglect to include some important piece of information regarding the message making it difficult for the recipient to ascertain specific information regarding the originator or that message from the message itself. For example, the originator of a telephone message may have forgotten to mention his or her name, department, message docket number, or other such desirable and often critical information thereby placing an often difficult burden on the recipient to obtain this information from outside sources.

Multimedia message systems known in the prior art can provide very limited assistance in solving this problem. For example, known multimedia message systems may provide the telephone number of the multimedia message system from which the message was transmitted and may also provide the name of the user if that name has been stored within the message system. However, such systems will not correctly identify the originator of a message if the originator is not known to the multimedia message system or if the originator is at a location not normally associated with that user within the message system.

Multimedia message systems known in the prior art also do not provide a method or system which permits an originator to prestore multiple audio segments of information in multimedia formats such as audio, visual or textual formats, in a repository such that these segments may be accessed at a later date and retrieved by recipients of messages from the originator through the utilization of an appended message associated with a primary message.

It should therefore be apparent that a need exists for a method and system whereby selectable audio messages may be stored by a user and selectively designated by that user for distribution to recipients in association with a primary message. The selectable audio messages may also be utilized to allow a recipient to access and retrieve pre-stored segments of information in multimedia formats such as audio, visual, or textual format.

SUMMARY OF THE INVENTION

It is therefore one object of the present invention to provide an improvement in the field of data processing systems.

It is another object of the present invention to provide an improvement in the efficient distribution of messages within a data processing system to a recipient utilizing one of a variety of distribution media.

It is yet another object of the present invention to provide an efficient method and system which permits a user to selectively designate pre-recorded audio messages for distribution with a primary message which permits a recipient to request a selected distribution of pre-recorded messages from the originator.

The foregoing objects are achieved as is now described. The method and system of the present invention are provided for enhancing the processing of audio messages. A user first creates a plurality of selectable audio messages including standard format salutations, originator identification material or other such messages. The selectable audio messages are then stored within the data processing system. Thereafter, the user may explicitly or automatically designate any of the selectable audio messages to be associated with a primary message. The audio messages are then distributed, utilizing the data processing system, to designated recipients. The recipient may then utilize the associated audio message to derive additional information regarding the originator of the primary message and may also obtain access to a repository of selectable audio messages associated with the originator and request a distribution of any or all of these selectable audio messages.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a graphic representation of a menu of selectable audio messages prepared in accordance with the method and system of the present invention; and FIG. 7 is a graphic representation of a data stream comprising associated selectable audio messages, a primary message and a digital representation of a selectable audio message in accordance with the method and system of the present invention.

DETAILED DESCRIPTION OF PREFERRED EMBODIMENT

Figure 1:
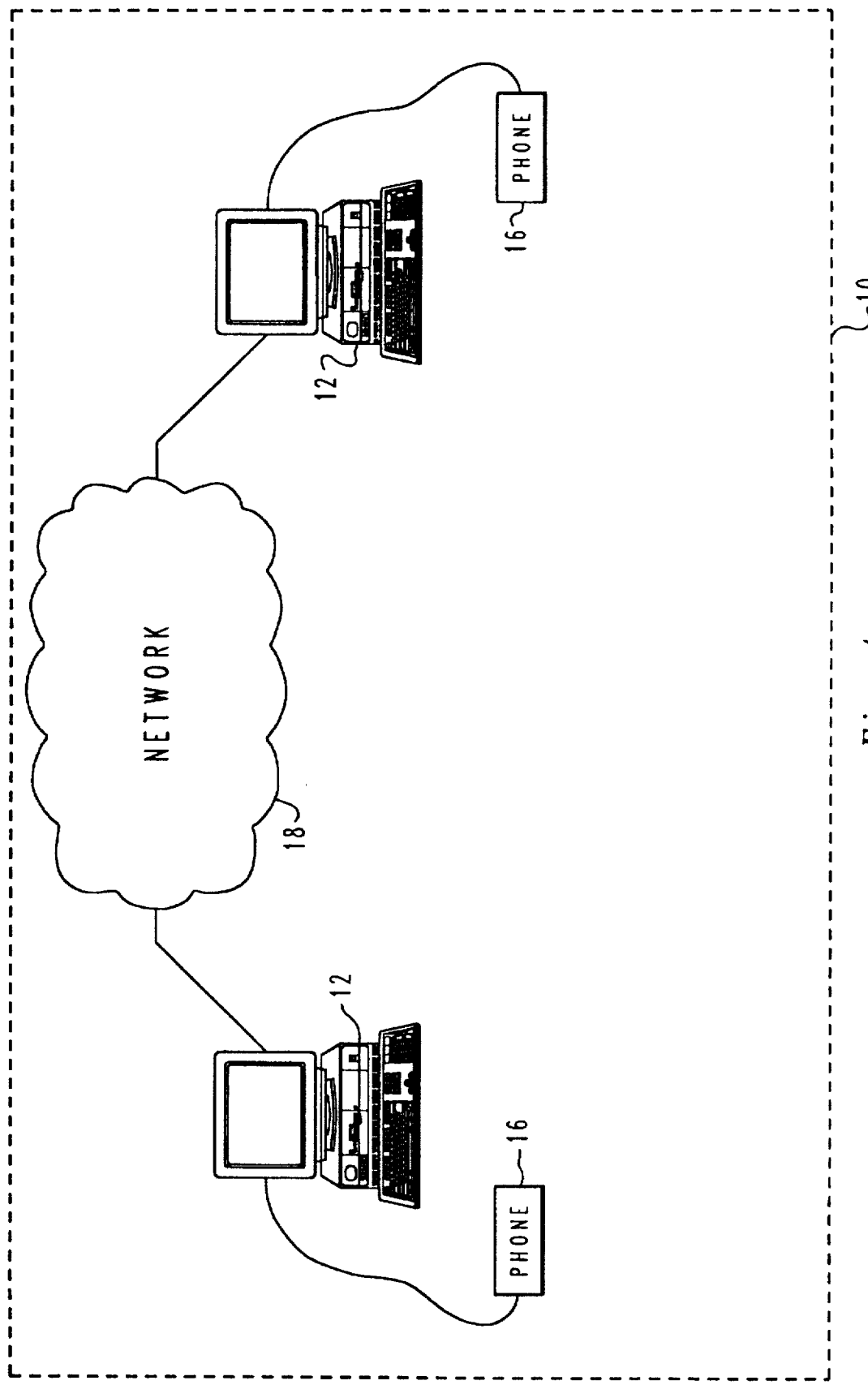
FIG. 1 depicts a representation of a data processing system which may be utilized to implement the method and system of the present invention.

With reference now to the figures and in particular with reference to FIG. 1, there is depicted a data processing system 10 which may be utilized to implement the method and system of the present invention. As illustrated, data processing system 10 preferably includes a plurality of computers 12 which are linked together via network 18. A telephone 16 is preferably coupled to each computer 12 and telephones 16 may be implemented utilizing modern state-of-the-art touch tone telephones, voice mail machines, such as the International Business Machines Corporation VM system, or by any other suitable audio message system. Computers 12 may be implemented utilizing so-called "personal" computers, such as the International Business Machines Corporation Model PS/2 Personal Computer, or by any other suitable terminal or workstation. Network 18 may be implemented utilizing any suitable electronic network such as the International Business Machines Corporation LAN STAR, or any other suitable network.

As is common in such data processing systems, each individual computer 12 may be utilized to convert audio formatted information into digital formatted information, such that the information may be processed and stored within a digital computer. Similarly, network 18 may also be utilized to perform similar functions. Those skilled in the art will appreciate that computers 12 and network 18 within data processing system 10 may also be utilized to perform a variety of other functions.

Within a system such as data processing system 10 it is often desirable for a user of a computer 12 and telephone 16 to transmit audio messages to recipient at another location within network 18. Often the messages sent by the originator contain repetitive information, such as "this is John Originator at extension 12345 in Product Development." In order for an originator to efficiently transmit repetitive information it would be desirable for a user to be able to store prerecorded selectable audio messages and to thereafter retrieve a designated selectable audio message for transmission to a recipient in association with a primary message. It would also be desirable for a recipient of an audio message having no additional information concerning the originator to be able to access additional information stored within a specialized database, called a repository, created by that originator without having to refer to a search through a general database. It should be appreciated by those skilled in the art that information stored within such a specialized database may be stored as audio information or in other formats such as visual or textual formats.

Figure 2:
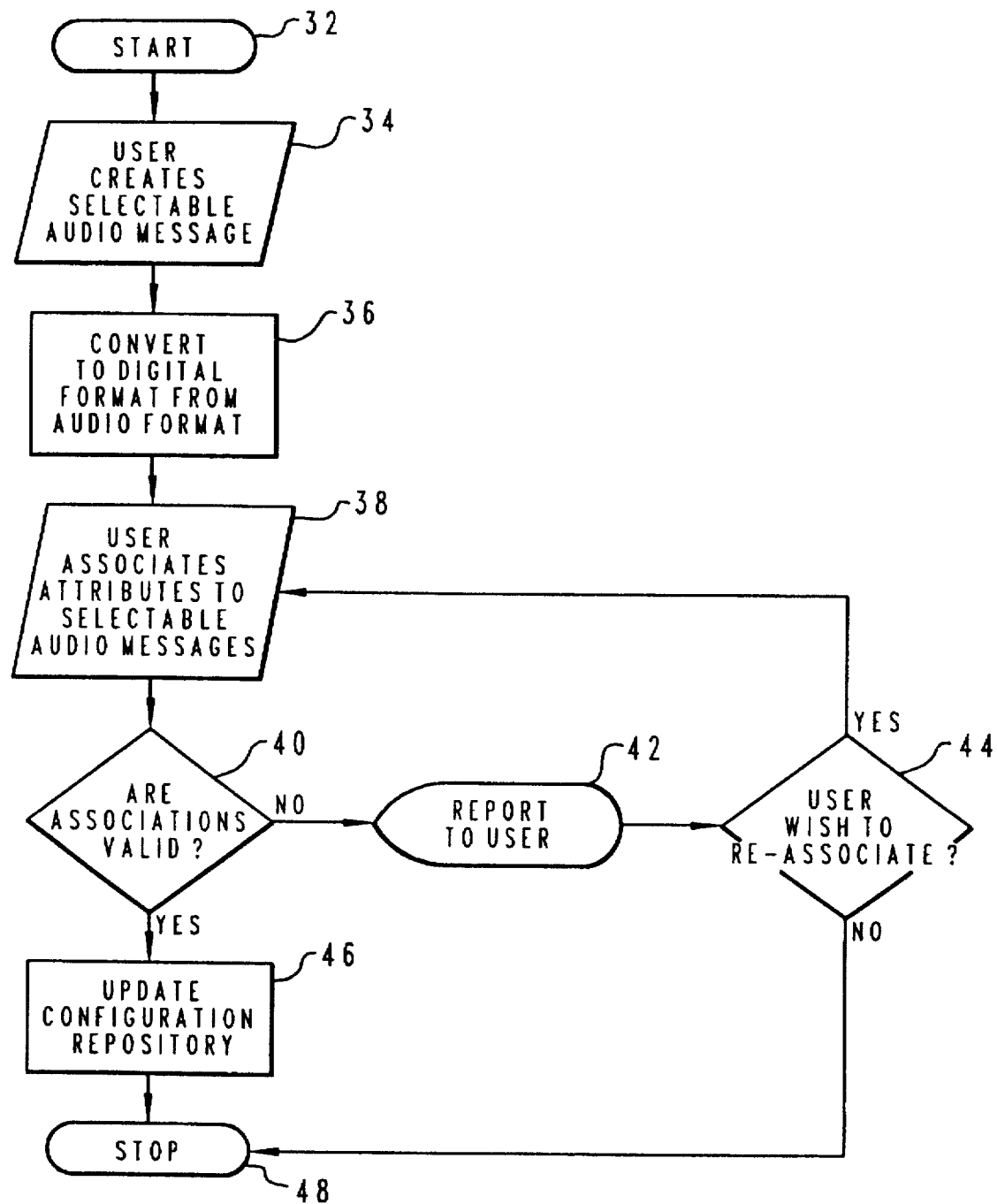
FIG. 2 is a high level logic flowchart depicting the process of creating a selectable audio message.

Referring now to FIG. 2 there is depicted a high level logic flowchart which illustrates the process of creating a selectable audio message in accordance with the method and system of the present invention. The process illustrated begins at block 32 and thereafter passes to block 34 which illustrates the creation of an audio message by the user. Those skilled in the art will appreciate upon reference to the present specification that an audio message may be identified and created by a user by merely speaking into telephone 16 coupled to computer 12. Further, while the present specification refers to audio messages it should be apparent to those skilled in the art that the message may contain additional components such as visual or textual components. The process of FIG. 2 then proceeds to block 36 wherein the message created within block 34 is converted to a digital format from the audio analog format previously discussed. The process then proceeds to block 38 which illustrates the association by the user of particular attributes with the audio message thus created. This process may occur as a result of a prompting of the user to designate attributes to associate with the selectable audio message; however, the user may also merely elect to associate particular attributes with the stored message for future utilization. Additionally, the data processing system may automatically associate selected attributes with a stored audio message such that user selection or association of the attributes to a message is not required, in a manner well known to those having skill in the art.

Next, the process proceeds from block 38 to block 40 which depicts a determination of whether or not the associations specified by the user or automatically generated by the data processing system are valid. If the associations are valid, the process proceeds to block 46 which updates the user's configuration repository. By updating the user's configuration repository what is meant is the selectable audio message together with its associated attributes are stored within a configuration repository. Thus, a spoken salutation which identifies the originator and his or her telephone number or address may be created and stored in association with an attribute which specifies that this message is a salutation.

Referring again to block 40 if the associations specified for a particular audio message are not valid, the process passes to block 42 which illustrates the reporting to the user of an error condition in that the associations are not valid. The process then passes to block 44 which illustrates a determination of whether or not the user wishes to attempt to reassociate a particular attribute with the audio message. If so, the process returns to block 38 in an iterative fashion. Alternately, or after updating the configuration repository, the process passes to block 48 and terminates.

Figure 3:
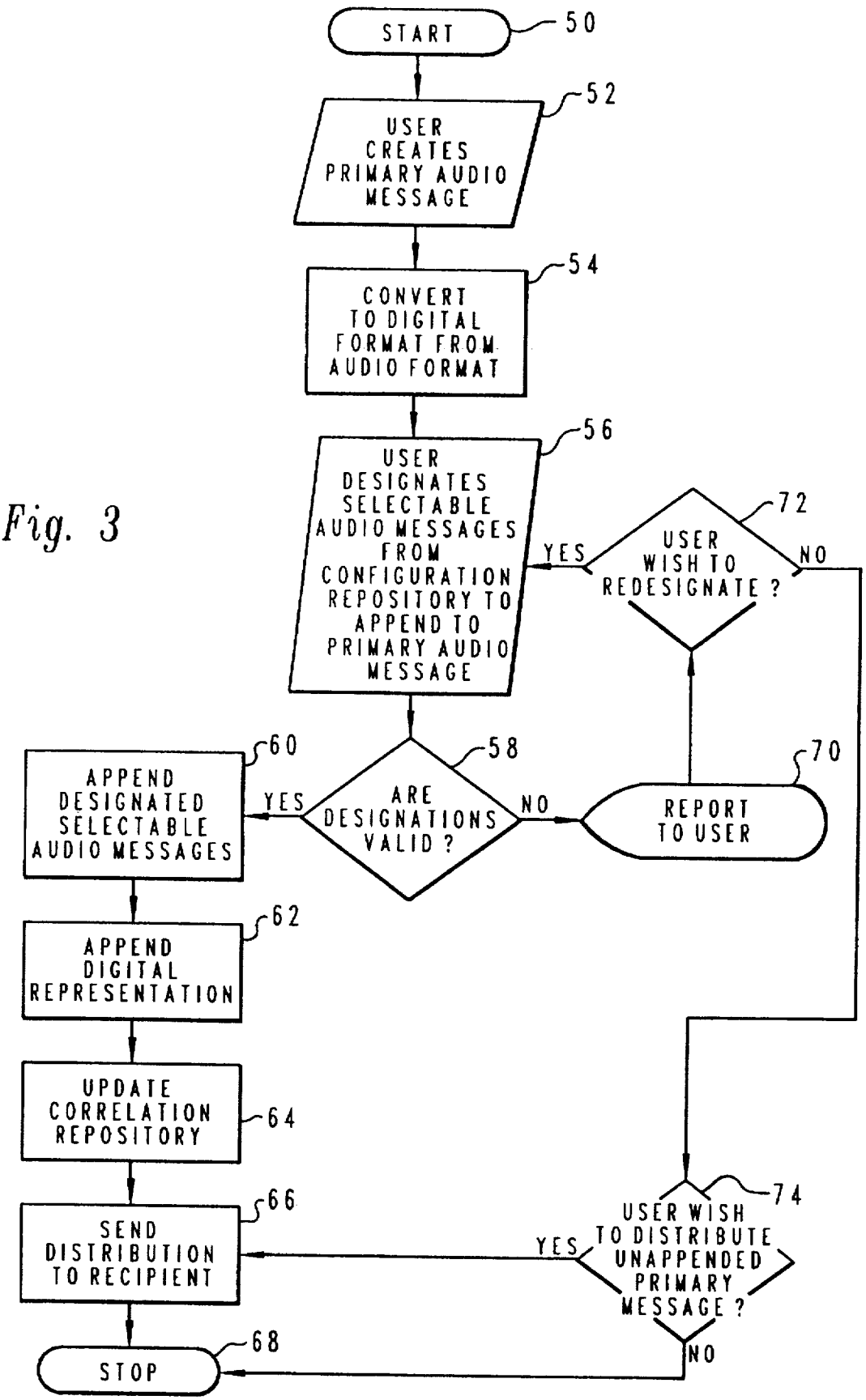
FIG. 3 is a high level logic flowchart depicting the creation and distribution of a primary message in association with a designated selectable audio message.

With reference now to FIG. 3 there is depicted a high level flowchart which illustrates the creation and distribution of a primary message in association with a designated selected audio message in accordance with the method and system of the present invention. As illustrated, the process begins at block 50 and thereafter proceeds to block 52 which depicts the creation by the user of a primary audio message. Again, an audio message may be created by the user by merely speaking into telephone 16 in association with a computer 12 in a manner well known to those having skill in the art. As above, the message thus created may contain visual or textual components. The process illustrated within FIG. 3 then passes to block 54 which depicts the conversion of the message into digital format for processing and storing within network 18 in any manner known to those having skill in this art. Next, the process passes to block 56 which illustrates the designation by the user of selectable audio message from the configuration repository which are appended to the primary message for transmission in association therewith. Of course, block 56 may be implemented utilizing a predetermined number of selectable audio messages which are automatically appended to each primary message generated by the user or by explicitly designating selected audio messages by the user in conjunction with the creation of a primary message.

Next, the process passes to block 58 which illustrates a determination of whether the selectable audio messages designated expressly by the user or automatically by the system are valid and if so, the process passes to block 60 which illustrates the appending of the designated selectable audio message to the primary message. Next, the process passes to block 62 which illustrates the appending of a digital representation to the primary message. As utilized herein, the digital representation comprises a digital pattern which may be utilized by a recipient of the primary message to locate the address of the configuration repository or a correlation repository associated with the originator of the primary message. In this manner a recipient of an audio or multimedia message may utilize the appended digital representation to selectively retrieve additional information regarding the message or the originator of the message. It should also be appreciated by those having skill in the art that the digital representation may also be utilized to restrict access to selected portions of the originator's configuration repository and that the digital representation may simply comprise a unique identifier associated with the originator of the primary message.

After appending a digital representation to the primary message and the designated selectable audio messages, the process passes to block 64. Block 64 illustrates the updating of the correlation repository of the originator to correlate the digital representation thus created with the distribution being transmitted wherein the distribution comprises the digital representation, the primary message, and the designated selectable audio messages. The process then passes to block 66 which depicts a distribution of a data stream which includes the primary message, the designated selectable audio messages and the digital representation described above. The process then passes to block 68 and terminates.

Referring again to block 58 if the designation of the selectable audio messages to be appended to the primary message are determined not to be valid, the process proceeds to block 70 which illustrates the creation of an error message to the user indicating that fact. Thereafter, the process passes to block 72 which depicts a determination of whether or not the user wishes to attempt to redesignate selectable audio messages to be appended to the primary message. If so, the process returns to block 56 in an iterative fashion. In the alternative, if the user does not Wish to redesignate selectable audio messages to be appended to the primary message the process passes to block 74. Block 74 illustrates a determination of whether or not the user wishes to distribute a primary message without appended selected audio messages and if so, the process passes to block 66 where, as described above, the distribution is transmitted to the intended recipient. Thereafter, or in the event the user does not wish to distribute the primary message without appended selectable audio messages the process passes to block 68 and terminates.

Figure 4:
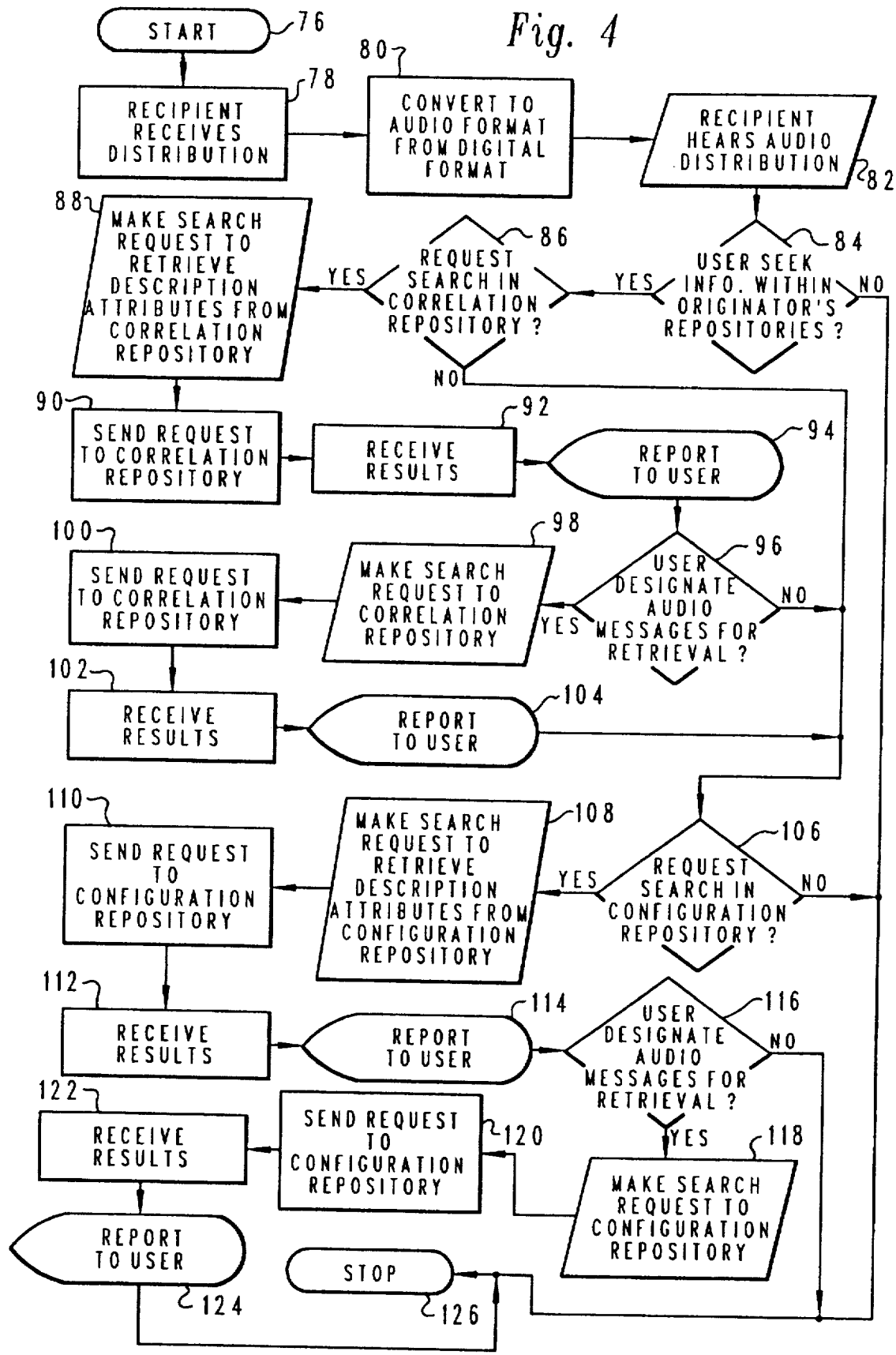
FIG. 4 is a high level logic flowchart depicting the reception of a primary message and the accessing of repositories of selectable audio messages in response to information associated with the primary message.

Referring now to FIG. 4 there is depicted a high level flowchart illustrating the reception of a distribution and an access of the originator's repositories of selectable audio messages in accordance with the method and system of the present invention. As illustrated, the process begins at block 76 and thereafter passes to block 78 which illustrates the receipt of a distribution by a recipient. The process then passes to block 80 which depicts the conversion of the distribution into an audio format from a digital format utilized for storage and transmission. Block 82 illustrates the reception of a distribution and the process then passes to block 84. Block 84 depicts a determination of whether or not the recipient desires to seek additional information regarding the distribution from the repositories of selectable audio messages associated with the originator. If not, the process passes to block 126 and terminates.

In the event the user does elect to seek additional information regarding the message from the repositories of selectable audio messages associated with the originator, the process passes to block 86. Block 86 depicts a determination of whether or not the recipient desires to request a search in the correlation repository of the originator of the primary message. As utilized herein, the term "correlation repository" means a repository which contains the primary message and selectable audio messages associated with that particular primary message. It will be appreciated by those having skill in the art upon reference to the foregoing that the selectable messages associated with the primary message may include visual or textual components as well. In the event the recipient request a search within the correlation repository, the process passes to block 88 which illustrates the creation of a search request by the recipient to retrieve the description attributes associated with the particular primary message. This search request may be made by depressing a key or combination of keys of telephone 16 of FIG. 1 or by utilizing an associated computer 12. The recipient does not need to obtain any information from the originator and does not need to obtain any information regarding the originator prior to making a search request as all information needed to locate the originator's correlation repository is contained within the digital representation which has been associated with the primary message in accordance with the method and system of the present invention. Next, the process passes to block 90 which illustrates the transmission of a request to the correlation repository and the process which will be depicted in FIG. 5 is performed.

Figure 5:
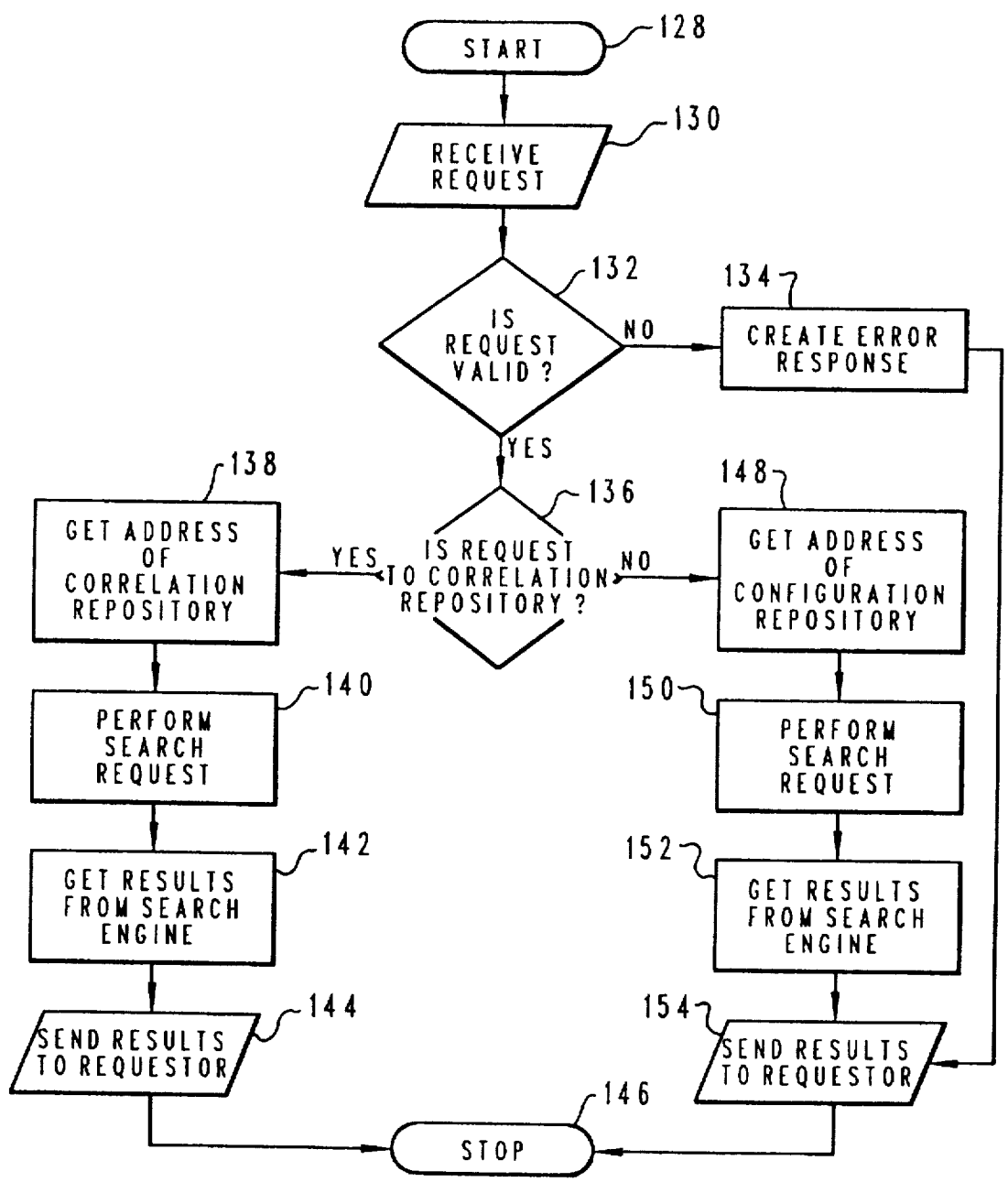
FIG. 5 is a high level logic flowchart depicting the search and retrieval of selectable audio message attributes and selectable audio messages in accordance with the method and system of the present invention.

Thereafter, the process proceeds to block 92 which illustrates the receipt by the recipient of the results of the search performed within the process of FIG. 5. These results typically contain the description attributes of the selectable audio messages in the correlation repository of the originator of the message and their associated selection numbers. The process then proceeds to block 94 wherein the results are reported to the recipient. Next, block 96 illustrates the querying by the data processing system as to whether or not the recipient desires to designate certain selectable audio messages within the originator's correlation repository for retrieval. If the recipient does not desire to designate any selectable audio messages within the originator's correlation repository for retrieval, the process passes to block 106.

In the event the recipient does desire to retrieve any selectable audio messages from the originator's correlation repository, a search request may be made by depressing a selected key or combination of keys on telephone 16 or computer 12. The process then proceeds to block 100 which illustrates the data processing system transmitting a request to the correlation repository and the process illustrated in FIG. 5 is then executed. The procedure depicted within FIG. 4 next proceeds to block 102 which illustrates the reception by the recipient of the results of this search. The results contained within block 102 typically include the designated selectable audio messages stored in the correlation repository along with any other components, such as visual or textual components. The process then proceeds to block 104 which depicts the results of this search being reported to the user.

Next, after reporting the results of the search to the user or after electing not to designate selected audio messages within the correlation repository for retrieval, the process passes to block 106. Block 106 illustrates a determination of whether or not the recipient desires to request a search within the configuration repository of the originator of the primary message. A configuration repository differs from the correlation repository in that the configuration repository preferably contains all of the selectable audio messages associated with a particular originator. It will be appreciated by those skilled in the art that these messages may also contain visual or textual components. As described above, this process begins at block 108 which illustrates the creation of a search request to retrieve descriptive attributes from the originator's configuration repository. Block 110 then depicts the transmission of this request to the configuration repository and block 112 then illustrates the receipt by the recipient of the results of that search. The results of the search are reported to the recipient, as depicted at block 114 and then block 116 illustrates the designation by the recipient of selected audio messages within the configuration repository for retrieval.

In the event the user does not designate any audio messages within the configuration repository for retrieval or alternatively, in the event the user does not desire to request a search within the configuration repository the process passes to block 126 and terminates. However, in the event designated audio messages within the configuration repository are selected for retrieval, block 118 illustrates the creation of a search request to the configuration library. Block 120 then depicts the transmission of that search request to the configuration repository and blocks 122 and 124 illustrate the receipt of results from that search and the reporting of the results to the recipient. Thereafter, as described above, the process passes to block 126 and terminates.

With reference now to FIG. 5 there is depicted a high level logic flowchart which illustrates the search and retrieval of selectable audio messages from the originator's correlation and configuration repositories. As illustrated, the process begins at block 128 and thereafter passes to block 130 wherein an illustration is depicted of the receipt by the data processing system of a search request from a recipient. The process then passes to block 132 wherein a determination is illustrated of whether or not the request is valid. If the request is invalid, the process passes to block 134 where the data processing system creates an error response. Next, the process passes to block 154 wherein the error response is transmitted to the requestor. The procedure then passes to block 146 and terminates.

Referring again to block 132, in the event the request is a valid request, the process then passes to block 136 which illustrates a determination of whether or not the request has been made to the originator's correlation repository. If a request has been made to the originator's correlation repository, the process passes to block 138 when the address of the correlation repository is determined. The address of the correlation repository is preferably determined by comparing the digital representation associated with the primary message illustrated at block 62 of FIG. 3 to the digital patterns of the selectable audio messages contained within the correlation repositories of the data processing system. In this manner, the data processing system is able to locate the correlation repository associated with a particular originator and access the selectable audio messages associated with the primary message.

Next, the procedure passes to block 140 wherein the data processing system performs the search request. The process then proceeds to block 142 which illustrates the retrieval of search results from the search engine in a manner well known to those skilled in the data processing system search arts. The process then passes to block 144 which depicts the returning of those results to the requestor and the process then terminates, as depicted at block 146.

Referring again to block 136 in the event the request by the recipient was not made to the correlation repository, the request was alternatively made to the configuration repository and the process passes to block 148. As described above with respect to the correlation repository, block 148 illustrates the obtaining of the address for the originator's configuration repository. The address of this repository is determined by comparing the digital representation associated with the primary message illustrated within block 62 of FIG. 3 to the digital patterns of the configuration repositories contained within the data processing system. In this manner, the data processing system is able to precisely locate the configuration repository associated with the originator of the primary message and access to store selectable audio messages therein. As above, the process then passes to block 150 which illustrates the performing of the search request and block 152 which depicts the obtaining of the results from a device for searching the repository and retrieving the selectable messages, called a search engine. These results are then transmitted to the requestor, as depicted in block 154 and again the process terminates, as illustrated in block 146.

Referring now to FIG. 6 there is depicted a graphic representation of a computer display of a menu of selectable audio messages. Menu 160 preferably contains a column having a selection number, as depicted at reference numeral 162, a column of textual representations of the messages at reference numeral 164, a column of preferable locations, as depicted at reference numeral 166, and a column of attributes, as illustrated at column 168. Each message entry textually depicted within column 164 represents an individual selectable audio message. Each message entry in column 164 has the specific attributes contained within columns 162, 166 and 168 associated with it and stored within the originator's configuration repository as described above. It will be understood by those having skill in this art that various other attributes may be associated with each message within column 164 in addition to or in lieu of those illustrated.

Next, the user, in the process depicted within FIG. 3, designates particular selectable audio messages to be associated with a primary message by entering the selection number attributes of column 162 of FIG. 6 in association with the messages set forth with in column 164. The data processing system will then associate those designated selectable audio messages with the primary message and distribute the messages in accordance with the location attribute of column 166. Of course, those skilled in the art will appreciate that particular selectable audio messages may also be selected and appended to a primary message automatically in response to the distribution of a primary message. Thus, certain default selectable audio messages may be selected for transmission with every primary message in accordance with the method and system of the present invention.

The recipient of a primary message and appended selectable audio messages as set forth within the process of FIG. 4 may then seek information within the repositories of the message originator by selecting the selection number attributes associated with the description attributes set forth within column 168 of FIG. 6. Of course, column 168 may include attributes regarding the primary messages as well as the originator. For example, classification levels, archive requirements and destruction procedures may be set forth within column 168 of an associated repository. In this manner, if the recipient is requesting information from a correlation repository, the recipient will be able to choose from the description attributes associated with the primary message. Alternately, if the recipient is requesting information from the originator's configuration repository, the recipient will be able to choose from any or all of the description attributes located within the configuration repository associated with a particular originator.

For example, if an originator transmits a primary message, the originator or another user could select from the selectable audio messages set forth within FIG. 6 audio message number 1 "this is John Originator ," selectable audio message number 2 "at extension 12345," and selectable audio message number "n" "and the following message is confidential and should be handled utilizing Company Confidential Procedure 1A-2B3,". These designated selectable audio messages may then be associated with the primary message and stored within the originator's correlation repository for distribution within a data stream as illustrated in accordance with FIG. 3. A data stream 172 is illustrated within FIG. 7 which may be utilized in accordance with the method and system of the present invention. As depicted, data stream 172 preferably includes a selectable audio message at reference numeral 176, a second selectable audio message at reference numeral 178, a third selectable audio message at reference numeral 180, a primary message at reference numeral 182 and a fourth selectable audio message at reference numeral 184. Additionally, a digital representation of an identification of the originator may also be coupled to and made a part of the data stream illustrated at reference numeral 172 such that the recipient of data stream 174 may be able to listen to the message and thereafter request a search of the originator correlation and/or configuration repositories as described above.

Upon reference to the foregoing those skilled in the art will appreciate that disclosed here in is a method whereby a plurality of selectable audio messages may be created stored and thereafter associated with primary messages to thereby increase the efficiency of the processing of audio messages within a data processing system.

While the invention has been particularly shown and described with reference to a preferred embodiment, it will be understood by those skilled in the art that various changes in form and detail may be made therein without departing from the spirit and scope of the invention.

We claim:

1. A method within a data processing system for enhanced processing of audio messages, said method comprising the data processing system implemented steps of:

creating a plurality of selectable audio messages;

storing said plurality of selectable audio messages within said data processing system; and, associating at least one of said plurality of selectable audio messages with a primary message within said data processing system in response to distribution of said primary message within said data processing system, wherein the associated at least one of said plurality of selectable audio messages has associated therewith a digital representation identifying an originator of said primary message, and wherein a recipient thereof capable of derive additional information from said primary message and said associated selectable audio message.

2. A method within a data processing system for enhanced processing of audio messages, said method comprising the data processing system implemented steps of:

creating a plurality of selectable audio messages;

storing said plurality of selectable audio messages within said data processing system; and, associating at least one of said plurality of selectable audio messages with a primary message within said data processing system in response to distribution of said primary message within said data processing system, wherein the associated at least one of said plurality of selectable audio messages includes selected attributes, and wherein a recipient thereof capable of derive additional information from said primary message and said associated selectable audio message.

3. A data processing system for enhanced processing of audio messages, said data processing system comprised of:

means for creating a plurality of selectable audio messages;

means for storing said plurality of selectable audio messages within said data processing system; and, means for associating at least one of said plurality of selectable audio messages with a primary message within said data processing system in response to distribution of said primary message within said data processing system, wherein the associated at least one of said plurality of selectable audio messages has associated therewith a digital representation identifying an originator of said primary message, and wherein a recipient thereof capable of derive additional information from said primary message and said associated selectable audio message.

4. A data processing system for enhanced processing of audio messages, said system comprising:

means for creating a plurality of selectable audio messages;

means for storing said plurality of selectable audio messages within said data processing system; and, means for associating at least one of said plurality of selectable audio messages with a primary message within said data processing system in response to distribution of said primary message within said data processing system, wherein the associated at least one of said plurality of selectable audio messages includes selected attributes, and wherein a recipient thereof capable of derive additional information from said primary message and said associated selectable audio message.

* * * * *

UNITED STATES PATENT AND TRADEMARK OFFICE
CERTIFICATE OF CORRECTION

PATENT NO. : 5,539,808
DATED : July 23, 1996
INVENTOR(S) : Inniss et al.

It is certified that error appears in the above-indentified patent and that said Letters Patent is hereby corrected as shown below:

On the title page: Item [54] and Column 1, line 2,

Change "WITH" to --WITHIN--

Signed and Sealed this

Tenth Day of December, 1996

Attest:

BRUCE LEHMAN

*Attesting Officer*    *Commissioner of Patents and Trademarks*